(12) United States Patent
Saka et al.

(10) Patent No.: US 12,095,077 B2
(45) Date of Patent: Sep. 17, 2024

(54) NON-AQUEOUS SECONDARY BATTERY

(71) Applicant: TOYOTA JIDOSHA KABUSHIKI KAISHA, Toyota (JP)

(72) Inventors: Hideyuki Saka, Toyota (JP); Keiichi Takahashi, Nishinomiya (JP); Hideaki Fujita, Kyotanabe (JP); Tatsuya Hashimoto, Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1259 days.

(21) Appl. No.: 15/324,356

(22) PCT Filed: Jun. 2, 2015

(86) PCT No.: PCT/JP2015/002778
§ 371 (c)(1),
(2) Date: Jan. 6, 2017

(87) PCT Pub. No.: WO2016/006154
PCT Pub. Date: Jan. 14, 2016

(65) Prior Publication Data
US 2017/0162866 A1 Jun. 8, 2017

(30) Foreign Application Priority Data

Jul. 10, 2014 (JP) .................. 2014-142139

(51) Int. Cl.
| | | |
|---|---|---|
| H01M 4/36 | (2006.01) | |
| H01M 4/131 | (2010.01) | |
| H01M 4/136 | (2010.01) | |
| H01M 4/1391 | (2010.01) | |
| H01M 4/505 | (2010.01) | |
| H01M 4/525 | (2010.01) | |

(Continued)

(52) U.S. Cl.
CPC ........... *H01M 4/364* (2013.01); *H01M 4/131* (2013.01); *H01M 4/136* (2013.01);
(Continued)

(58) Field of Classification Search
CPC .... H01M 4/364; H01M 4/5825; H01M 4/525; H01M 4/505; H01M 4/131; H01M 4/136;
(Continued)

(56) References Cited

U.S. PATENT DOCUMENTS

2006/0099495 A1* 5/2006 Suzuki .................. H01M 2/021
429/128
2008/0176140 A1* 7/2008 Nishiyama ............ H01M 4/134
429/218.1

(Continued)

FOREIGN PATENT DOCUMENTS

| | | |
|---|---|---|
| CN | 102117913 A | 7/2011 |
| CN | 102210047 A | 10/2011 |

(Continued)

OTHER PUBLICATIONS

Machine translation of KR20130100698A (Year: 2023).*
International Search Report for application No. PCT/JP2015/002778 dated Sep. 21, 2015.

*Primary Examiner* — Brian R Ohara
*Assistant Examiner* — Michelle T Leonard
(74) *Attorney, Agent, or Firm* — Sughrue Mion, PLLC

(57) ABSTRACT

A non-aqueous secondary battery includes a positive electrode composite material layer. In a cross-section in a direction of thickness of the positive electrode composite material layer, the positive electrode composite material layer includes a first region including one end portion in a direction intersecting with the direction of thickness, a second region including the other end portion, and a third region lying between the first region and the second region. The first region is composed of a first composite material containing lithium iron phosphate and lithium nickel cobalt manganese composite oxide, and the second region is composed of a second composite material containing lithium iron phosphate and lithium nickel cobalt manganese com- (Continued)

posite oxide. The third region is composed of a third composite material containing lithium nickel cobalt manganese composite oxide.

11 Claims, 7 Drawing Sheets

(51) Int. Cl.
*H01M 4/58* (2010.01)
*H01M 10/04* (2006.01)
*H01M 10/0525* (2010.01)
*H01M 10/0587* (2010.01)

(52) U.S. Cl.
CPC ......... *H01M 4/1391* (2013.01); *H01M 4/366* (2013.01); *H01M 4/505* (2013.01); *H01M 4/525* (2013.01); *H01M 4/5825* (2013.01); *H01M 10/0431* (2013.01); *H01M 10/0525* (2013.01); *H01M 10/0587* (2013.01); *H01M 10/0413* (2013.01); *H01M 2220/20* (2013.01); *Y02E 60/10* (2013.01)

(58) Field of Classification Search
CPC ............. H01M 4/366; H01M 10/0587; H01M 10/0431
See application file for complete search history.

(56) References Cited

U.S. PATENT DOCUMENTS

| | | | |
|---|---|---|---|
| 2008/0248390 A1 | 10/2008 | Yada et al. | |
| 2012/0288759 A1* | 11/2012 | Nagai | H01M 4/13 429/211 |
| 2015/0017499 A1* | 1/2015 | Nishiyama | H01M 4/1397 429/94 |
| 2015/0333323 A1 | 11/2015 | Umeyama et al. | |
| 2016/0099462 A1* | 4/2016 | Jeong | H01M 4/366 429/221 |
| 2016/0133930 A1* | 5/2016 | Kim | H01M 4/505 429/220 |

FOREIGN PATENT DOCUMENTS

| | | |
|---|---|---|
| CN | 102668186 A | 9/2012 |
| CN | 102956874 A | 3/2013 |
| EP | 2 357 693 A1 | 8/2011 |
| EP | 2 555 286 A2 | 2/2013 |
| JP | 2008-235150 A | 10/2008 |
| JP | 2015-220121 A | 12/2015 |
| KR | 1020090008870 A | 1/2009 |
| KR | 20130100698 A * | 9/2013 |
| KR | 1020130100698 A | 9/2013 |

* cited by examiner

NON-AQUEOUS SECONDARY BATTERY

This is a National Stage of International Application No. PCT/JP2015/002778 filed Jun. 2, 2015, claiming priority based on Japanese Patent Application No. 2014-142139 filed Jul. 10, 2014, the contents of all of which are incorporated herein by reference in their entirety.

TECHNICAL FIELD

The present invention relates to a non-aqueous secondary battery.

BACKGROUND ART

Various studies have been conducted in order to enhance output characteristics at a low state of charge (hereinafter denoted as SOC) of a non-aqueous secondary battery. For example, Japanese Patent Laying-Open No. 2008-235150 (PTL 1) has proposed a non-aqueous electrolytic secondary battery in which a positive electrode active material contains lithium-containing metal oxide containing at least Co and $Li_bFePO_4$ (where b satisfies the condition of $0 \leq b < 1$).

CITATION LIST

Patent Literature

[PTL 1] Japanese Patent Laying-Open No. 2008-235150

SUMMARY OF INVENTION

Technical Problem

According to PTL 1, by mixing in a positive electrode active material such as $LiNi_{0.80}Co_{0.15}Al_{0.05}O_2$, 10 mass % or less of lithium iron phosphate lower in operating potential than that, sharp increase in resistance of the positive electrode active material in a final stage of discharge (that is, at low SOC) can be suppressed and high output is obtained over wide SOC. Taking into account a behavior at the time of overcharge, however, there remains a further room for improvement also in such a technique.

For example, in a large battery to be mounted on cars, in case of overcharge of a battery, a current interrupt device (hereinafter denoted as a CID) of a pressure operating type may be adopted, which physically interrupts a conduction path when an internal pressure of the battery exceeds a prescribed pressure (also referred to as an "operation pressure") at the time of overcharge. In this case, a positive electrode is required to have a function to promptly activate the CID by generating a gas through reaction with a gas generation agent (also referred to as an "overcharge additive") in an electrolyte at the time of overcharge.

In PTL 1, lithium iron phosphate adopted as the positive electrode active material low in operating potential is very low in conductivity, and hence conductivity thereof is compensated for by coating a surface of particles with carbon. In order to further secure prescribed battery output, a ratio of a conductive material should be raised also in a positive electrode composite material in which lithium iron phosphate has been mixed. Since lithium iron phosphate is also low in capacity per volume, the capacity of the positive electrode per volume also lowers in accordance with an amount of mixed lithium iron phosphate. Therefore, in order to maintain a capacity of the battery, a filling factor of a positive electrode composite material layer, that is, density of the composite material, should be raised in accordance with an amount of mixed lithium iron phosphate.

Higher density of the composite material, however, leads to less voids within a layer and decrease in amount of an electrolyte which can be retained in the positive electrode composite material layer. Thus, a contact factor between the positive electrode active material and the gas generation agent contained in the electrolyte lowers and an amount of generation of a gas at the time of overcharge also decreases. Furthermore, a path for emission of the generated gas is also reduced, and disadvantageously, an internal pressure cannot efficiently be raised.

The present invention was made in view of the problems above. Therefore, an object of the present invention is to provide a non-aqueous secondary battery high in output at low SOC and large in amount of generation of a gas at the time of overcharge.

Solution to Problem

[1] A non-aqueous secondary battery includes a positive electrode composite material layer. In a cross-section in a direction of thickness of the positive electrode composite material layer, the positive electrode composite material layer includes a first region including one end portion in a direction intersecting with the direction of thickness, a second region including the other end portion, and a third region lying between the first region and the second region. The first region is composed of a first composite material containing lithium iron phosphate and lithium nickel cobalt manganese composite oxide, and the second region is composed of a second composite material containing lithium iron phosphate and lithium nickel cobalt manganese composite oxide. The third region is composed of a third composite material containing lithium nickel cobalt manganese composite oxide.

In the non-aqueous secondary battery including the features above, high output is obtained even at low SOC, and in addition, a large amount of gas is generated at the time of overcharge so that the CID is promptly activated. A mechanism thereof will be described in detail below. In the description below, lithium iron phosphate and lithium nickel cobalt manganese composite oxide may be abbreviated as "LFP" and "LNCM", respectively.

FIG. 4 is a schematic cross-sectional view showing opposing positional relation between a positive electrode and a negative electrode in a non-aqueous secondary battery. A positive electrode composite material layer 10b, a negative electrode composite material layer 20b, and a separator 40 all extend in a direction of depth in FIG. 4. Positive electrode composite material layer 10b includes in respective both end portions in a direction intersecting with a direction of thickness TD, a first region R1 and a second region R2 containing particulate LFP 1 and particulate LNCM 2, and further includes in a central portion lying between first region R1 and second region R2, a third region R3 containing particulate LNCM 2. Here, with LFP 1 being mixed, first region R1 and second region R2 are higher in composite material density than third region R3.

Positive electrode composite material layer 10b is opposed to negative electrode composite material layer 20b with separator 40 lying therebetween. Negative electrode composite material layer 20b includes in each of both end portions in a direction of width, a non-opposing portion NF not opposed to positive electrode composite material layer 10b. This is because, when positive electrode composite material layer 10b extends off negative electrode composite material layer 20b, metal lithium (Li) may precipitate during charging, and hence an area of negative electrode composite material layer 20b in a plan view is set to be larger than an area of positive electrode composite material layer 10b.

FIG. 4 schematically shows with a chain dotted line, migration of lithium ions ($Li^+$) during charging. $Li^+$ emitted from positive electrode composite material layer 10b migrates to opposing negative electrode composite material layer 20b and reacts with a negative electrode active material (such as graphite). Here, no $Li^+$ directly migrates from positive electrode composite material layer 10b to non-opposing portion NF. According to the studies conducted by the present inventor, however, it has been found that, in negative electrode composite material layer 20b, $Li^+$ diffuses from a portion adjacent to non-opposing portion NF into non-opposing portion NF. With diffusion of $Li^+$ into non-opposing portion NF, more $Li^+$ should be supplied to the negative electrode in first region R1 or second region R2 in proximity to non-opposing portion NF than in third region R3, and hence a positive electrode potential locally increases in first region R1 and second region R2.

The non-aqueous secondary battery above thus contains LFP 1 in the both portions (first region R1 and second region R2) of positive electrode composite material layer 10b where a positive electrode potential tends to locally increase. LFP 1 is a positive electrode active material low in conductivity, that is, high in resistance, as described previously. Therefore, it is considered that local potential increase in first region R1 and second region R2 is spurred at the time of overcharge, reaction between a gas generation agent and the positive electrode active material becomes active for suppression of this potential increase, and an amount of generation of a gas in these regions significantly increases.

In third region R3 not positively containing LFP 1, however, it is not necessary to raise composite material density and an amount of generation of a gas in this region does not decrease.

Therefore, in the non-aqueous secondary battery above, even when composite material density in first region R1 and second region R2 is slightly higher with mixing of LFP 1, a sufficient amount of generation of a gas can be ensured. Namely, an amount of generation of a gas at the time of overcharge can be increased while output at low SOC is enhanced by mixing of LFP 1.

[2] Preferably, a ratio of lithium iron phosphate in a total mass of a positive electrode active material in the positive electrode composite material layer is not lower than 3 mass % and not higher than 30 mass %. This is because, by thus restricting a ratio of LFP, output at low SOC can further be enhanced.

[3] Preferably, the positive electrode composite material layer is rectangular in a plan view, and the first region, the second region, and the third region extend along a longitudinal direction of the positive electrode composite material layer.

This is because, since each region is formed to extend along the longitudinal direction of the positive electrode composite material layer, an area of the first region and the second region can be ensured, output at low SOC is improved, and an amount of generation of a gas at the time of overcharge is increased. Here, a "plan view" means a field of view in a direction of normal of a main surface of the positive electrode composite material layer (see, for example, FIG. 5).

[4] Preferably, relation of $0.2 \leq (W1+W2)/W0 \leq 0.4$ is satisfied where W0 represents a width of the positive electrode composite material layer in a direction of a short side of the positive electrode composite material layer, W1 represents a width of the first region, and W2 represents a width of the second region. By thus restricting a width of a region containing LFP, an amount of generation of a gas at the time of overcharge can further be increased.

Advantageous Effects of Invention

According to the above, a non-aqueous secondary battery high in output at low SOC and large in amount of generation of a gas at the time of overcharge is provided.

DESCRIPTION OF EMBODIMENTS

Though one embodiment of the present invention (hereinafter denoted as the "present embodiment") will be described hereinafter in detail, the present embodiment is not limited thereto. In the description below, a median diameter (hereinafter denoted as "d50") represents a value measured with a laser diffraction scattering method unless otherwise specified.

<Non-Aqueous Secondary Battery>

Figure 1:
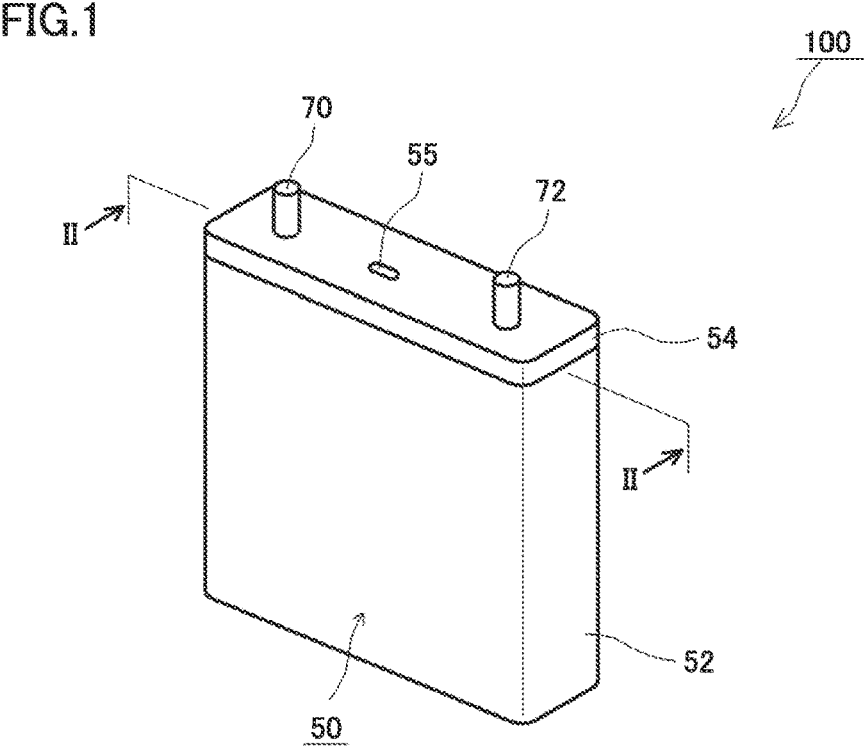
FIG. 1 is a schematic perspective view showing one example of a construction of a non-aqueous secondary battery according to one embodiment of the present invention.

FIG. 1 is a schematic perspective view showing one example of a construction of a non-aqueous secondary battery according to the present embodiment. Referring to FIG. 1, a battery 100 is a sealed battery and includes an exterior body 50 in a prismatic shape. Exterior body 50 is constituted of a case 52 and a lid 54. A raw material for exterior body 50 is exemplified, for example, by an aluminum (Al) alloy. Case 52 and lid 54 are joined, for example, through laser welding. Lid 54 is provided with a positive electrode terminal 70 and a negative electrode terminal 72. Lid 54 is further provided with a safety valve 55 for emitting a gas generated in exterior body 50. Safety valve 55 is regulated to open at a pressure higher than an operating pressure of a CID 30 which will be described later.

Figure 2:
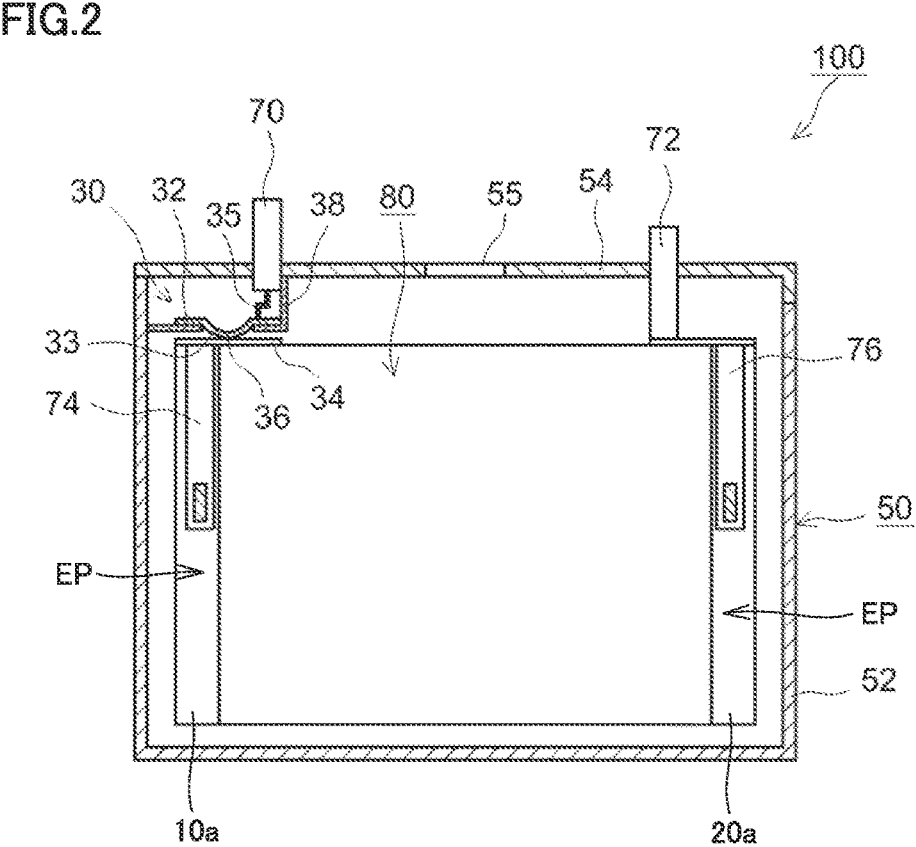
FIG. 2 is a schematic cross-sectional view along the line II-II in FIG. 1.

An internal structure of battery 100 will now be described. FIG. 2 is a schematic cross-sectional view of battery 100 along the line II-II in FIG. 1. Referring to FIG. 2, battery 100 contains an electrode group 80 and a non-aqueous electrolyte (not shown). The inside of battery 100 is not fully filled with these contained components, but a space volume is present in battery 100. Here, the "space volume" represents a volume calculated by subtracting a volume of contained components (electrode group 80 and the non-aqueous electrolyte) from an inner volume of exterior body 50. The present embodiment is particularly effective for a large battery having a large space volume therein, because a larger space volume requires a larger amount of gas for activation of CID 30. Such a large battery can be exemplified, for example, by a battery used in a hybrid vehicle (HV) or an electric vehicle (EV) (having a rated capacity of approximately 20 Ah or higher).

<Current Interrupt Device (CID)>

CID 30 of a pressure operating type is arranged in a conduction path on a positive electrode side of battery 100. CID 30 includes a deformable metal plate 32, a connection metal plate 34, and an insulating case 38. Connection metal plate 34 is electrically connected to a positive electrode collector plate 74. Deformable metal plate 32 has a curved portion 33 of which central portion is downwardly curved and is in contact with connection metal plate 34 at a tip end (a contact point 36) of curved portion 33. Deformable metal plate 32 is electrically connected to positive electrode terminal 70 through a collector lead 35. A conduction path connecting positive electrode terminal 70 and positive electrode collector plate 74 to each other is thus formed.

Insulating case 38 is made, for example, of a resin, arranged to surround deformable metal plate 32, seals a space surrounded by deformable metal plate 32, insulating case 38, and exterior body 50, and separates the space from other spaces in exterior body 50.

As an internal pressure in exterior body 50 increases, the internal pressure is applied to a lower surface of curved portion 33 of deformable metal plate 32 and pushes up curved portion 33. When the internal pressure exceeds the operating pressure, curved portion 33 is vertically inverted to disconnect contact point 36, such that the conduction path connecting positive electrode terminal 70 and positive electrode collector plate 74 to each other is interrupted.

Here, though CID 30 is provided in the conduction path on the positive electrode side in FIG. 2, the CID may be provided in a conduction path on a negative electrode side or may be provided in conduction paths on both sides. The CID is not limited to the construction above, and may be constructed in any way so long as the CID is activated as being triggered by increase in internal pressure. For example, an external circuit sensing an internal pressure with a sensor and interrupting a current when a value for the sensed pressure exceeds a set value may be provided as a CID.

<Electrode Group>

Figure 3:
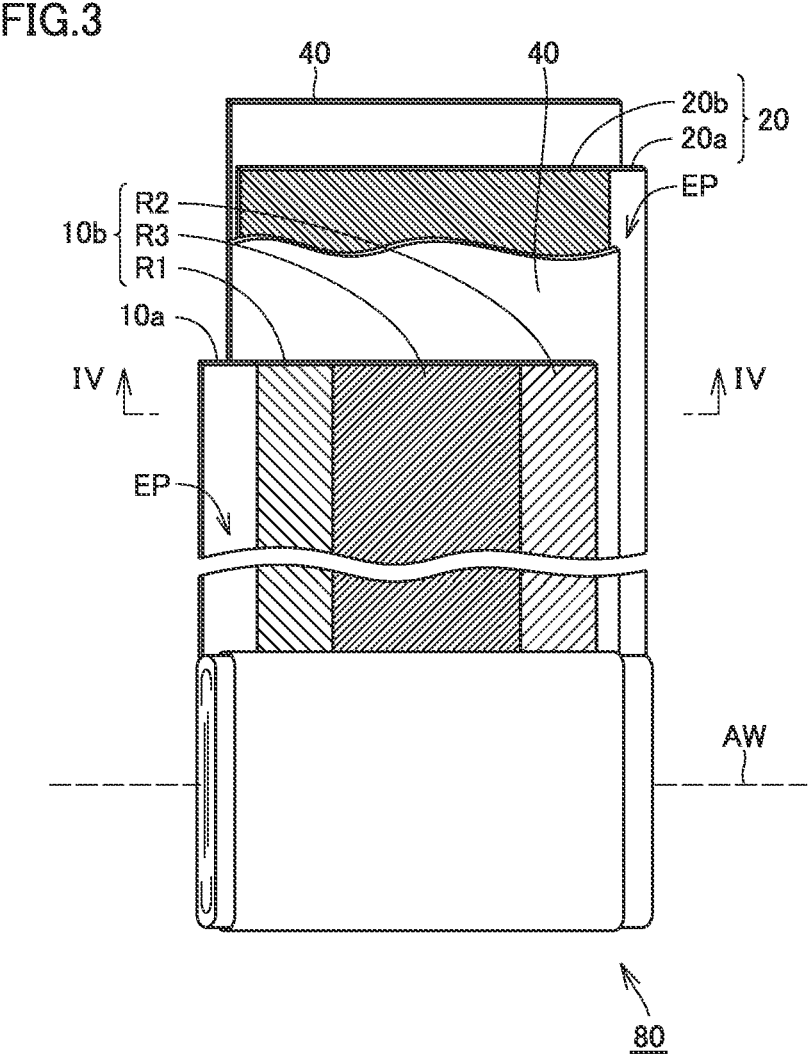
FIG. 3 is a schematic diagram showing one example of a construction of an electrode group according to one embodiment of the present invention.

FIG. 3 is a schematic diagram showing one example of a construction of an electrode group. Referring to FIG. 3, electrode group 80 is an electrode group of a wound-type. A positive electrode 10, a negative electrode 20, and separator 40 constituting electrode group 80 are each a sheet member in an elongated belt shape. Electrode group 80 is made up by winding positive electrode 10 including positive electrode composite material layer 10b and negative electrode 20 including negative electrode composite material layer 20b along the longitudinal direction of positive electrode composite material layer 10b such that positive electrode 10 and negative electrode 20 are opposed to each other with separator 40 lying therebetween.

Positive electrode 10 and negative electrode 20 each have one end portion in a direction of width (in a direction of a short side), a core material exposed portion EP where a collector core material (typically, a metal foil) is exposed. In electrode group 80, positive electrode 10 and negative electrode 20 are arranged as being opposed to each other such that core material exposed portions EP can be taken out in directions different from each other along an axis of winding AW.

Figure 4:
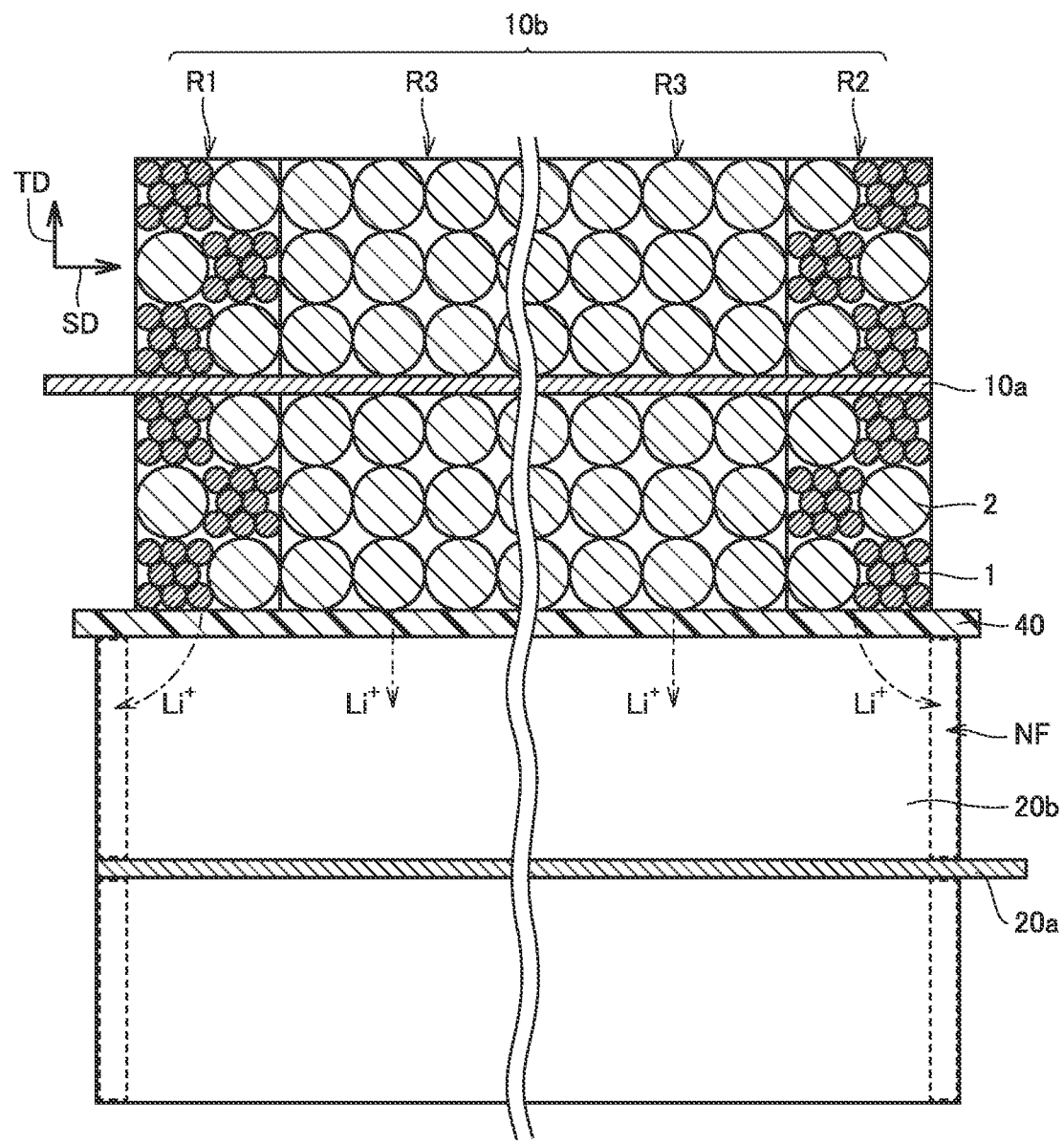
FIG. 4 is a schematic cross-sectional view along the line IV-IV in FIG. 3.

FIG. 4 is a schematic cross-sectional view along the line Iv-Iv in FIG. 3. Referring to FIG. 4, positive electrode composite material layer 10b and negative electrode composite material layer 20b are opposed to each other with separator 40 lying therebetween. Negative electrode composite material layer 20b includes non-opposing portion NF not opposed to positive electrode composite material layer 10b, in each of opposing end portions in the direction of width. In the present embodiment, Li$^+$ diffuses into non-opposing portion NF, and by making use of the fact that a positive electrode potential in both end portions (first region R1 and second region R2) of positive electrode composite material layer 10b in proximity thereto tends to locally increase, a positive electrode active material (LFP) high in resistance is caused to be present in this portion in an unbalanced manner. Increase in potential is thus accelerated and gas generation reaction is efficiently triggered.

Referring again to FIG. 2, positive electrode collector plate 74 and a negative electrode collector plate 76 are welded to respective core material exposed portions EP of electrode group 80. As described previously, positive electrode collector plate 74 is connected to positive electrode terminal 70 via CID 30 and negative electrode collector plate 76 is connected to negative electrode terminal 72. In battery 100, first region R1 and second region R2 large in amount of generation of a gas are formed in respective both end portions of positive electrode 10 in a direction of a short side SD, so that CID 30 can be activated promptly at the time of overcharge.

<Positive Electrode>

Figure 5:
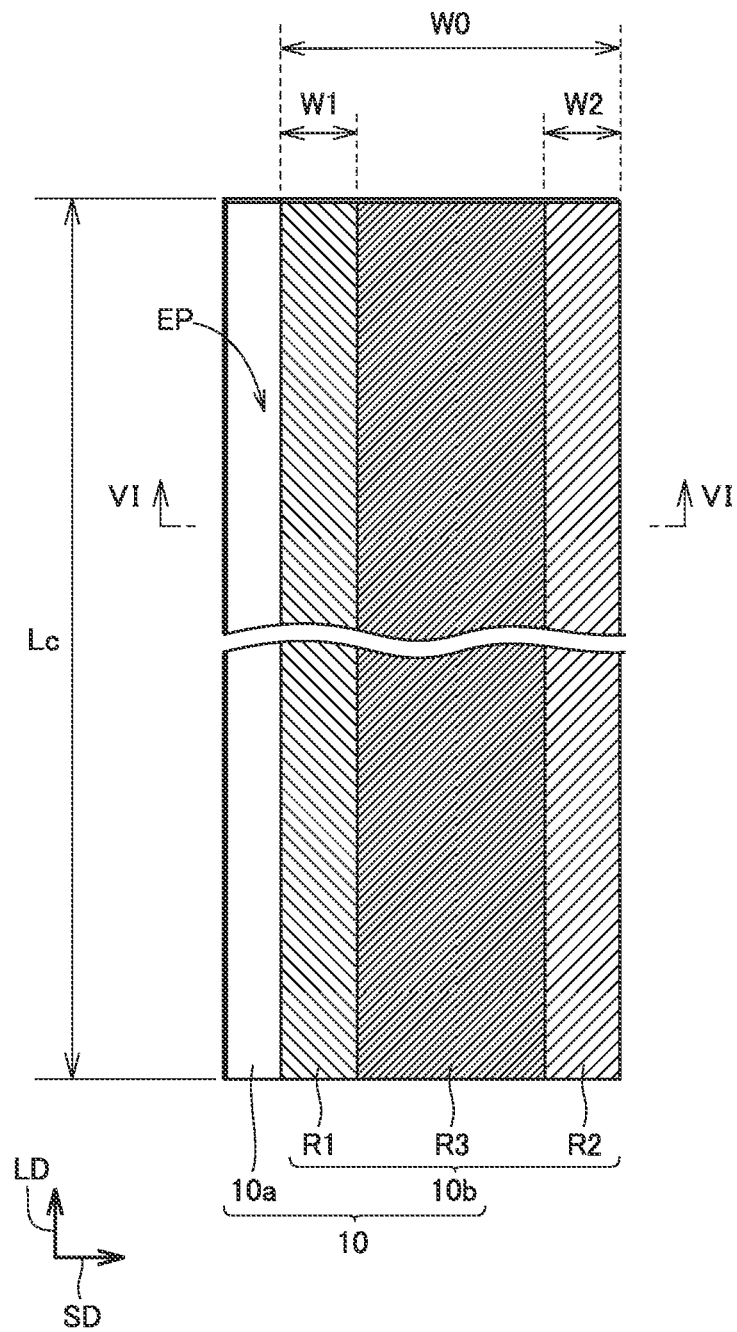
FIG. 5 is a schematic plan view showing one example of a construction of a positive electrode according to one embodiment of the present invention.

FIG. 5 is a schematic plan view showing one example of a construction of positive electrode 10. Referring to FIG. 5, positive electrode 10 includes a positive electrode collector core material 10a in an elongated belt shape (that is, in a rectangular shape) in a plan view and positive electrode composite material layer 10b in an elongated belt shape formed on each of opposing main surfaces thereof. Positive electrode collector core material 10a is formed, for example, from an Al foil. Positive electrode 10 can be fabricated with a conventionally known method. For example, positive electrode 10 can be fabricated by coating the main surface of positive electrode collector core material 10a with a positive electrode composite material paste obtained by dispersing a positive electrode composite material in a prescribed solvent, followed by drying. Here, for example, N-methyl-2-pyrrolidone (NMP) can be used as the solvent. A thickness and composite material density may be adjusted by compressing dried positive electrode composite material layer 10b.

<Positive Electrode Composite Material Layer>

Referring to FIG. 5, positive electrode composite material layer 10b includes first region R1, second region R2, and third region R3 extending along a longitudinal direction LD of positive electrode composite material layer 10b. First region R1, second region R2, and third region R3 are formed in such a manner that, in the direction of short side SD, first region R1 includes one end portion, second region R2 includes the other end portion, and third region R3 includes a central portion lying between first region R1 and second region R2.

Figure 6:
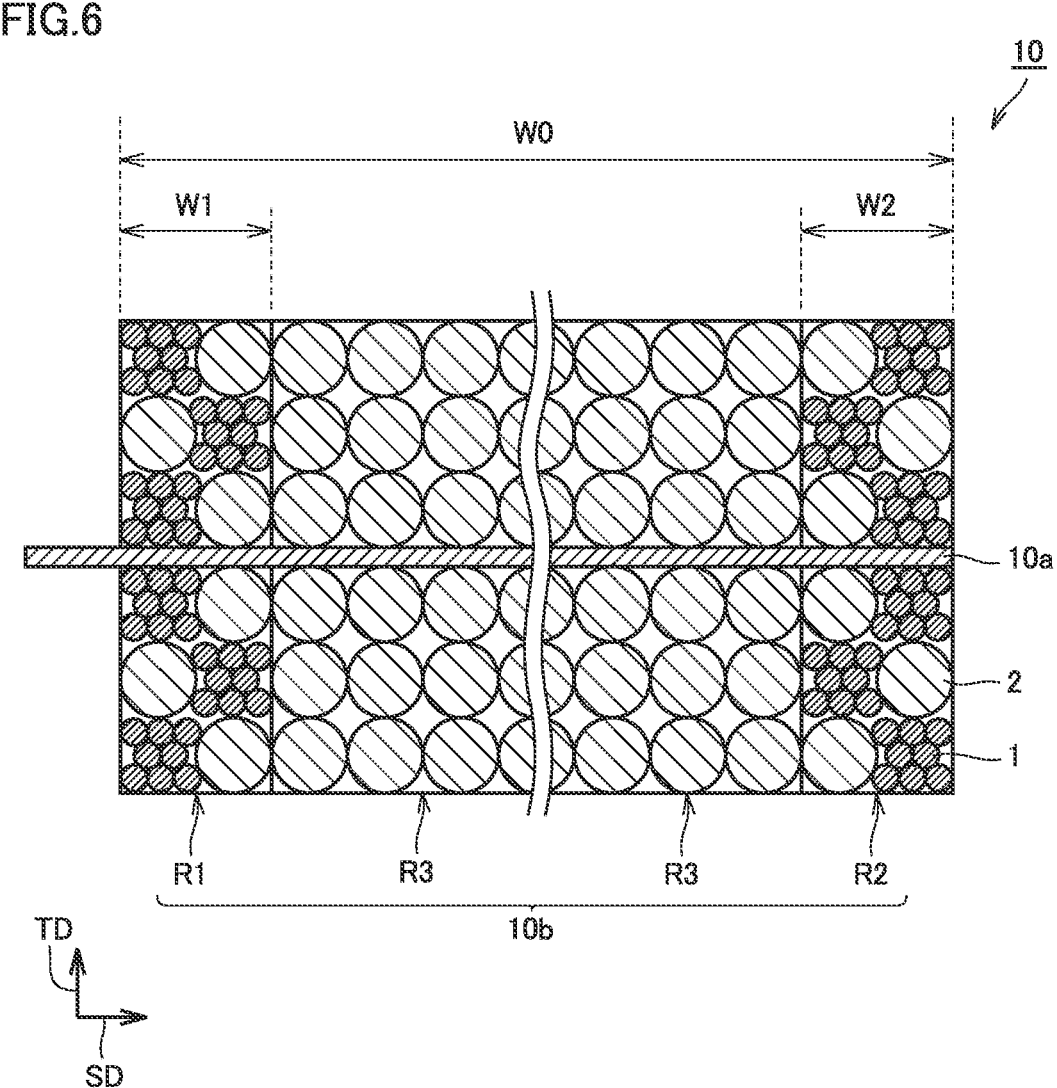
FIG. 6 is a schematic cross-sectional view along the line VI-VI in FIG. 5.

FIG. 6 is a schematic cross-sectional view along the line VI-VI in FIG. 5. Referring to FIG. 6, positive electrode composite material layer 10$b$ includes, in a cross-section in parallel to a direction of thickness TD (a thickness direction cross-section), first region R1 including one end portion in a direction intersecting with the direction of thickness TD (the direction of short side SD), second region R2 including the other end portion, and third region R3 lying between first region R1 and second region R2. Here, first region R1 and second region R2 are composed of a positive electrode composite material containing LFP 1 and LNCM 2, and third region R3 is composed of a positive electrode composite material containing LNCM 2.

<First Region and Second Region>

First region R1 is composed of a first composite material, and second region R2 is composed of a second composite material. The first composite material and the second composite material contain a positive electrode active material (LFP and LNCM) as well as a conductive material and a binder (neither of which is shown).

In the present embodiment, the first composite material and the second composite material can be the same positive electrode composite material. Though the first composite material and the second composite material may naturally be different from each other in composite material compounding so long as they contain LFP and LNCM, the composite material compounding is desirably the same in consideration of productivity.

<Lithium Iron Phosphate>

The first composite material and the second composite material contain particulate lithium iron phosphate (LFP). LFP is composite phosphate expressed by a chemical formula LiFePO$_4$, and has an olivine type crystal structure. LFP can allow insertion and desertion of Li$^+$ at approximately 3.4 V [vs. Li$^+$/Li]. This potential is equivalent to approximately 20% of SOC of a battery in which a positive electrode active material is composed only of LNCM. Therefore, it is considered that, in a positive electrode in which LFP is mixed with LNCM, even when SOC of the battery is lowered, a concentration of Li$^+$ in LFP remains low and LFP can accept Li$^+$, and hence high output can be exhibited even at low SOC.

In LFP, some Fe may be substituted with other elements (such as Co, Ni, and Mn) in the chemical formula LiFePO$_4$, so long as increase in potential at the time of overcharge and output at low SOC are not excessively lowered. LFP may lightly be doped with another element. Such another different element can be exemplified, for example, by magnesium (Mg), silicon (Si), calcium (Ca), titanium (Ti), vanadium (V), chromium (Cr), zinc (Zn), gallium (Ga), zirconium (Zr), niobium (Nb), molybdenum (Mo), tin (Sn), hafnium (Hf), and tungsten (W).

LFP desirably has its surface coated with carbon. For example, powders of secondary particles obtained by coating surfaces of primary crystal particles composed of LFP with carbon and aggregating a plurality of primary crystal particles can be used. This is because conductivity of LFP is thus compensated for and output characteristics are further enhanced. Though an amount of coating is not particularly restricted, a mass ratio between a base material (LFP) and carbon (C) is, for example, LFP:C=approximately 98:2 to 99:1.

Powders of LFP (powders of the secondary particles) desirably have a median diameter (d50) not smaller than 0.5 μm. This is because, when d50 is smaller than 0.5 μm, compressibility of the positive electrode composite material lowers and such a disadvantage as a break of positive electrode 10 during winding is concerned. Though the upper limit of d50 is not particularly restricted, the upper limit is, for example, approximately 10 μm and preferably approximately 5 μm, in consideration of productivity.

<Lithium Nickel Cobalt Manganese Composite Oxide>

The first composite material and the second composite material contain particulate lithium nickel cobalt manganese composite oxide (LNCM). LNCM is a compound expressed by a general formula LiNi$_a$Co$_b$Mn$_c$O$_2$ (where 0<a<1, 0<b<1, 0<c<1, and relation of a+b+c=1 is satisfied). LNCM is high in energy density per volume and it is excellent also in thermal stability.

Here, in the general formula LiNi$_a$Co$_b$Mn$_c$O$_2$, a, b, and c in the formula satisfy more preferably relation of 0.2<a<0.4, 0.2<b<0.4, 0.2<c<0.4 and further preferably relation of 0.3<a<0.35, 0.3<b<0.35, 0.3<c<0.35. This is because, when a composition ratio among Ni, Co, and Mn satisfies the relation above, balance in energy density and thermal stability further improves. Here, LNCM may also lightly be doped with another element (such as Mg) described previously.

In consideration of dispersibility during mixing, powders composed of LNCM (powders of the secondary particles) have d50, for example, approximately from 1 to 20 μm, preferably approximately from 3 to 15 μm, and more preferably approximately from 5 to 10 μm.

From a point of view of a capacity of a battery, a ratio of the positive electrode active material in the first composite material and the second composite material is, for example, approximately from 80 to 95 mass %, preferably approximately from 80 to 90 mass %, and more preferably approximately from 85 to 90 mass %. Here, a mass ratio between LFP and LNCM in the first composite material and the second composite material is preferably LFP:LNCM=approximately 20:80 to 80:20, more preferably LFP:LNCM=approximately 25:75 to 60:40, and particularly preferably LFP:LNCM=40:60 to 60:40. The ratio is set as such in order to ensure output at low SOC and an amount of generation of a gas at the time of overcharge while excessively high composite material density in first region R1 and second region R2 is suppressed.

<Conductive Material>

The first composite material and the second composite material can contain a conductive material. A conventionally known material can be employed for the conductive material. For example, one or more of acetylene black (AB), Ketjen black (trademark), flake graphite, vein graphite, amorphous graphite, and vapor grown carbon fiber (VGCF) can be employed. In the first composite material and the second composite material containing LFP, a high ratio of the conductive material is desirably set in order to ensure conductivity. A ratio of the conductive material in the first composite material and the second composite material is, for example, approximately from 5 to 15 mass %, preferably approximately from 7 to 13 mass %, and more preferably approximately from 9 to 11 mass %.

<Binder>

The first composite material and the second composite material can contain a binder. A conventionally known material can be used for the binder. For example, polyvinylidene difluoride (PVdF) or polytetrafluoroethylene (PTFE) can be employed. A ratio of the binder in the first composite material and the second composite material is, for example, approximately from 1 to 7 mass % and preferably approximately from 2 to 6 mass %.

<Third Region>

Third region R3 is composed of the third composite material. The third composite material contains LNCM. Though the third composite material may contain LFP, in that case, it contains LFP in an amount smaller than in the first composite material and the second composite material, in order to keep composite material density in third region R3 low. Taking into account an amount of generation of a gas at the time of overcharge, however, desirably, the third composite material contains no LFP but it contains LNCM alone as the positive electrode active material. A ratio of the positive electrode active material in the third composite material is, for example, approximately from 80 to 95 mass %, preferably approximately from 80 to 90 mass %, and more preferably approximately from 85 to 90 mass %.

Likewise the first composite material, the third composite material can also contain a conductive material and a binder described previously, in addition to the positive electrode active material (LNCM). Since the third composite material is less in content of LFP than the first composite material, a ratio of the conductive material can also be set to be lower. A ratio of the conductive material in the third composite material is, for example, approximately from 4 to 12 mass %, preferably approximately from 5 to 11 mass %, and more preferably approximately from 7 to 9 mass %. A ratio of the binder in the third composite material is, for example, approximately from 1 to 7 mass % and preferably approximately from 2 to 6 mass %.

<Ratio of Lithium Iron Phosphate in Total Mass of Positive Electrode Active Material>

In positive electrode composite material layer 10b as a whole, a ratio of LFP in the total mass of the positive electrode active material is preferably not lower than 3 mass % and not higher than 30 mass %. When the ratio is lower than 3 mass %, output at low SOC cannot sufficiently be obtained in some cases, and when the ratio exceeds 30 mass % as well, significant improvement in output is not expected, which is not cost efficient. The ratio is more preferably not lower than 10 mass % and not higher than 30 mass %, further preferably not lower than 10 mass % and not higher than 25 mass %, and most preferably not lower than 10 mass % and not higher than 20 mass %.

Positive electrode composite material layer 10b can also contain, other than LFP and LNCM, other positive electrode active materials (for example, $LiCoO_2$, $LiNiO_2$, or $LiMn_2O_4$). In that case, a ratio of other positive electrode active materials in the total mass of the positive electrode active material is desirably lower than 50 mass %, in order to keep balance between output at low SOC and an amount of generation of a gas at the time of overcharge. For the same reason, a ratio of other positive electrode active materials is more desirably lower than 30 mass %, further desirably lower than 10 mass %, and most desirably lower than 5 mass %.

<Width of Each Region>

In the direction of short side SD in the plan view (FIG. 5), a width W1 of first region R1 and a width W2 of second region R2 may be equal to or different from each other. In consideration of productivity, however, W1 and W2 are desirably equal to each other.

Furthermore, from a point of view of further increase in amount of generation of a gas, relation of $0.2 \leq (W1+W2)/W0 \leq 0.4$ is preferably satisfied, where W0 represents a width of positive electrode composite material layer 10b, W1 represents a width of first region R1, and W2 represents a width of second region R2.

<Negative Electrode>

Figure 7:
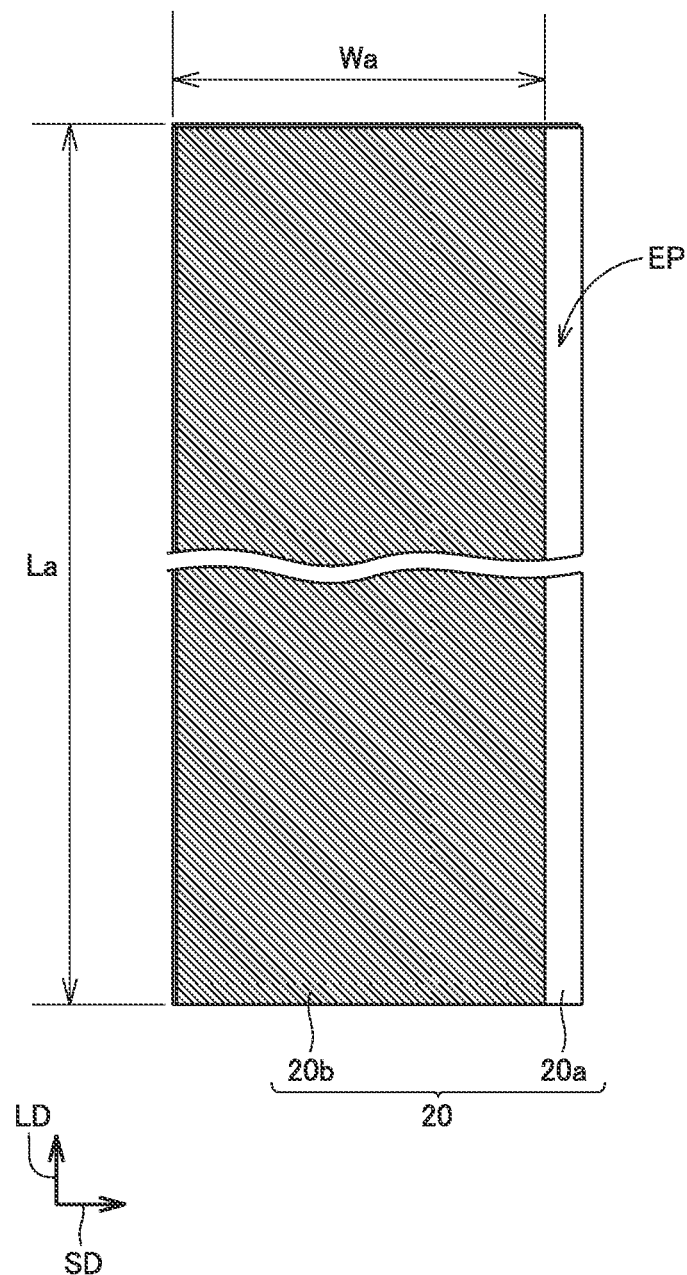
FIG. 7 is a schematic plan view showing one example of a construction of a negative electrode according to one embodiment of the present invention.

FIG. 7 is a schematic plan view showing a construction of negative electrode 20. Referring to FIG. 7, negative electrode 20 includes a negative electrode collector core material 20a in an elongated belt shape in a plan view and negative electrode composite material layer 20b in an elongated belt shape formed on each of opposing main surfaces thereof. Negative electrode collector core material 20a is formed, for example, from a Cu foil. Negative electrode 20 can be fabricated with a conventionally known method. For example, negative electrode 20 is fabricated by coating the main surface of negative electrode collector core material 20a with a negative electrode composite material paste obtained by dispersing a negative electrode composite material in a prescribed solvent, followed by drying. Here, for example, water (including ion exchanged water) can be employed as the solvent. A thickness and composite material density may be adjusted by compressing dried negative electrode composite material layer 20b.

Negative electrode composite material layer 20b is obtained by adhering a negative electrode composite material containing a negative electrode active material, a thickener, and a binder onto the main surface of negative electrode collector core material 20a. The negative electrode active material is not particularly restricted, and it should only be able to function as a negative electrode active material of a non-aqueous secondary battery. For example, a carbon-based negative electrode active material such as graphite and coke or an alloy-based negative electrode active material such as Si and Sn can be employed. A ratio of the negative electrode active material in negative electrode composite material layer 20b is, for example, approximately from 90 to 99 mass %.

A conventionally known material can be employed for the thickener and the binder. For example, carboxymethylcellulose (CMC) or polyvinyl alcohol (PVA) can be employed as the thickener. For example, styrene-butadiene rubber (SBR) or PTFE can be employed as the binder. A ratio of the thickener and the binder in negative electrode composite material layer 20b is, for example, approximately from 1 to 10 mass %.

<Separator>

Separator 40 prevents electrical contact between positive electrode 10 and negative electrode 20 while it allows permeation of $Li^+$. Separator 40 is preferably formed from a microporous film made of a polyolefin-based material, from a point of view of mechanical strength and chemical stability. For example, a microporous film, for example, of polyethylene (PE) or polypropylene (PP) is suitable.

Separator 40 may be formed by layering a plurality of microporous films, and it may include a heat-resistant layer containing an inorganic filler (such as alumina particles or titania particles) on its surface. Separator 40 has a thickness, for example, approximately from 5 to 40 μm. A pore diameter and a porosity of separator 40 are desirably adjusted as appropriate such that air permeability attains to a desired value.

<Non-Aqueous Electrolyte>

A non-aqueous electrolyte is obtained by dissolving Li salt in an aprotic solvent. As the aprotic solvent, for example, cyclic carbonates such as ethylene carbonate (EC), propylene carbonate (PC), butylene carbonate (BC), g-butyrolactone (gBL), and vinylene carbonate (VC) and chain carbonates such as dimethyl carbonate (DMC), ethyl methyl carbonate (EMC), and diethyl carbonate (DEC) can be employed. Two or more of these aprotic solvents are desirably used together, from a point of view of electrical conductivity and electrochemical stability. In particular, cyclic carbonate and chain carbonate are desirably used as being mixed, and in that case, a volume ratio between the cyclic carbonate and the chain carbonate is preferably approximately from 1:9 to 5:5.

As a solute (Li salt), for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide [Li$(CF_3SO_2)_2$N], or lithium trifluoromethanesulfonate ($LiCF_3SO_3$) can be employed. Two or more of these solutes may be used together. Though a concentration of a solute in the non-aqueous electrolyte is not particularly limited, from a point of view of discharge characteristics and storage characteristics, the concentration is preferably approximately from 0.5 to 2.0 mol/L.

<Gas Generation Agent>

In addition to the components above, the non-aqueous electrolyte can contain a gas generation agent. The gas generation agent is a compound having an oxidation potential in a charge region (hereinafter denoted as an "overcharge region") where SOC of a battery exceeds 100%. For example, a compound having an oxidation potential approximately not lower than 4.5 V [vs. $Li^+$/Li] at the time when an upper limit charging voltage of the battery is set approximately to 4.0 to 4.2 V can be employed as the gas generation agent. Specifically, an aromatic compound such as cyclohexylbenzene (CHB), biphenyl (BP), biphenylether (BPE), tert-butylbenzene (TBB), or tert-amylbenzene (TAB), or a derivative thereof can function as the gas generation agent. Among these, CHB and BP are particularly suitable because they are large in amount of generation of a gas.

These compounds start electrolytic polymerization when a positive electrode potential exceeds an oxidation potential of the compound itself and increase battery resistance owing to a polymerization product, and in addition, they generate a gas so as to promote increase in internal pressure. The mechanism of generation of a gas is not limited as such, and a gas may be generated with any mechanism so long as a gas is generated in the overcharge region.

Two or more gas generation agents may be used together, without limited to only one gas generation agent. From a point of view of an amount of generation of a gas, however, the gas generation agent desirably contains CHB. Therefore, when two or more gas generation agents are used together, composition thereof is preferably selected such that 50 mass % or more of the total amount of the generation agents is occupied by CHB. For example, by adding the same mass of CHB and BP to a non-aqueous electrolyte, the resultant non-aqueous electrolyte can function as the gas generation agent. A ratio of CHB in the gas generation agent is more preferably not lower than 70 mass % and particularly preferably not lower than 90 mass %.

A content of the gas generation agent in the non-aqueous electrolyte (that is, an amount of addition of the gas generation agent to the non-aqueous electrolyte) is preferably not lower than 1 mass % and not higher than 7 mass %. When the content is lower than 1 mass %, a desired amount of generation of a gas cannot be ensured in some cases. When the content exceeds 7 mass % on the other hand, an amount of generation of a gas does not significantly increase, which is not cost efficient. A content of the gas generation agent is more preferably not lower than 2 mass % and not higher than 5 mass %, because production cost can be reduced while a larger amount of generation of a gas is ensured.

<Modification>

Figure 8:
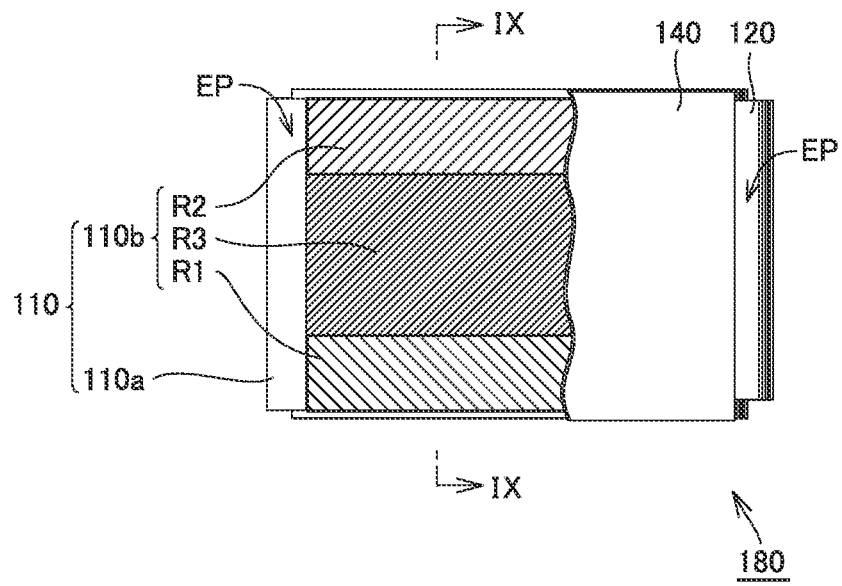
FIG. 8 is a schematic diagram showing a modification of the electrode group.

A modification of the electrode group will now be described. The electrode group in the present embodiment is not limited to electrode group 80 of the wound type described previously and it may be an electrode group of a layered type (also referred to as a stack type). FIG. 8 is a schematic diagram showing one example of the electrode group of the layered type. Referring to FIG. 8, an electrode group 180 of the layered type is obtained by alternately layering a positive electrode 110 and a negative electrode 120 with a separator 140 lying therebetween. A direction of depth in FIG. 8 corresponds to a direction of layering of electrode group 180. Positive electrode 110 includes a rectangular positive electrode collector core material 110a in a plan view and a positive electrode composite material layer 110b formed on each of opposing main surfaces thereof.

Figure 9:
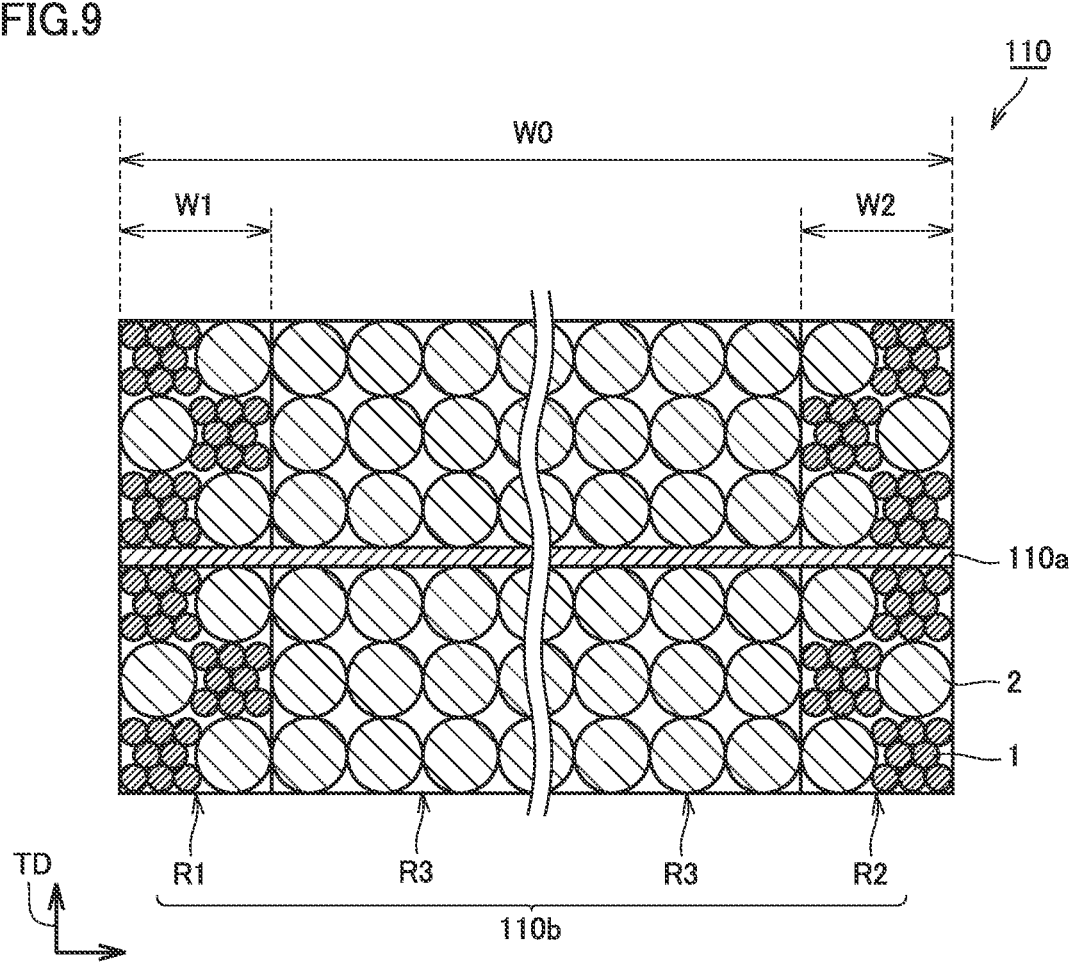
FIG. 9 is a schematic cross-sectional view of a positive electrode along the line IX-IX in FIG. 8.

FIG. 9 shows a cross-section in a direction of thickness of positive electrode 110 along the line IX-IX in FIG. 8. Referring to FIG. 9, positive electrode composite material layer 110b also includes first region R1 including one end portion in a direction intersecting with the direction of thickness TD, second region R2 including the other end portion, and third region R3 lying between first region R1 and second region R2. First region R1 is composed of the first composite material containing LFP 1 and LNCM 2, and second region R2 is composed of the second composite material containing LFP 1 and LNCM 2. Third region R3 is composed of the third composite material containing LNCM.

Though not shown, likewise negative electrode 20 described previously, negative electrode 120 also includes a negative electrode composite material layer having a non-opposing portion not opposed to positive electrode composite material layer 110b. Namely, first region R1 and second region R2 are portions where a positive electrode potential tends to locally increase with diffusion of $Li^+$ into the non-opposing portion. Therefore, in a non-aqueous secondary battery including such electrode group 180 of the layered type as well, so long as positive electrode composite material layer 110b includes the features above, high output can be obtained at low SOC and a large amount of gas can be generated at the time of overcharge.

Though the present embodiment has been described above by way of example of a battery in a prismatic shape, the present embodiment is not limited to the battery in a prismatic shape but is also applicable to a cylindrical battery or a pouch-type battery (also referred to as a laminate-type battery).

Examples

Though the present embodiment will be described hereinafter in further detail with reference to Examples, the present embodiment is not limited thereto.

<Fabrication of Non-Aqueous Secondary Battery>

Batteries A1 to A20 and batteries B1 to B4 were fabricated as follows, and output at low SOC and an amount of generation of a gas at the time of overcharge were evaluated. Here, batteries A1 to A20 correspond to Examples and batteries B1 to B4 correspond to Comparative Examples.

<Battery A1>

1. Fabrication of Positive Electrode

Referring to FIG. 5, positive electrode 10 formed as a sheet member in an elongated belt shape and having core material exposed portion EP in one end portion in the direction of width (the direction of short side SD) was fabricated. In the present experiment, positive electrode 10 in FIG. 5 had a length Lc of 6150 mm, positive electrode composite material layer 10b had width W0 of 117 mm, and an electrode had a thickness of 120 μm.

A positive electrode composite material paste (hereinafter denoted as a "mixture paste") to serve as the first composite material and the second composite material was obtained by mixing and kneading powders of a positive electrode active material ($LiFePO_4$ and $LiNi_{1/3}Co_{1/3}Mn_{1/3}O_2$), powders of a conductive material (AB), and powders of a binder (PVdF) together with a solvent (NMP). Here, a compounding ratio (a mass ratio) of the first composite material and the second composite material was set to the positive electrode active material:the conductive material:the binder=86:10:4, and a breakdown (a mass ratio) of the positive electrode active material was set to $LiFePO_4:LiNi_{1/3}Co_{1/3}Mn_{1/3}O_2$=60:40.

A positive electrode composite material paste (hereinafter denoted as an "LNCM alone paste") to serve as the third composite material was obtained by mixing and kneading powders of a positive electrode active material ($LiNi_{1/3}Co_{1/3}Mn_{1/3}O_2$), powders of a conductive material (AB), and powders of a binder (PVdF) together with a solvent (NMP). Here, a compounding ratio (a mass ratio) of the third composite material was set to the positive electrode active material:the conductive material:the binder=88:8:4.

A portion to serve as third region R3 on one main surface of positive electrode collector core material 10a (an Al foil having a thickness of 15 μm) was coated with the LNCM alone paste and a portion to serve as first region R1 and second region R2 thereon was coated with the mixture paste, followed by drying with hot air. Positive electrode composite material 10b was thus formed. In succession, after positive electrode composite material layer 10b was formed similarly also on the opposite main surface of positive electrode collector core material 10a, positive electrode composite material layer 10b was compressed such that the entire positive electrode composite material layer 10b was even in thickness. Positive electrode 10 was thus formed. Here, composite material density in third region R3 was 2.7 g/cm³.

As shown in Table 1, battery A1 was adjusted such that width W0 of positive electrode composite material layer 10b, width W1 of first region R1, and width W2 of second region R2 satisfied relation of W1=W2 and (W1+W2)/W0=0.1. Therefore, in positive electrode composite material layer 10b, a ratio of $LiFePO_4$ in the total mass of the positive electrode active material was 6 mass %. "LFP" in Table 1 represents "$LiFePO_4$" and "LNCM" represents "$LiNi_{1/3}CO_{1/3}Mn_{1/3}O_2$". "LFP/LFP+LNCM" represents a ratio (unit: mass %) of $LiFePO_4$ in the total of $LiFePO_4$ and $LiNi_{1/3}Co_{1/3}Mn_{1/3}O_2$.

TABLE 1

| | Both End Portions of Positive Electrode Composite Material Layer (First Region, Second Region) | | Entire Positive Electrode Composite Material Layer | |
|---|---|---|---|---|
| | (W1 + W2)/W0 [-] | LFP/(LFP + LNCM) [Mass %] | LFP/(LFP + LNCM) [Mass %] | Remarks |
| Battery B1 | 0 | 0 | 0 | LNCM alone region in its entirety |
| Battery A1 | 0.1 | 60 | 6 | — |
| Battery A2 | 0.2 | 60 | 12 | — |
| Battery A3 | 0.3 | 60 | 18 | — |
| Battery A4 | 0.4 | 60 | 24 | — |
| Battery A5 | 0.5 | 60 | 30 | — |
| Battery A6 | 0.1 | 50 | 5 | — |
| Battery A7 | 0.2 | 50 | 10 | — |
| Battery A8 | 0.3 | 50 | 15 | — |
| Battery A9 | 0.4 | 50 | 20 | — |
| Battery A10 | 0.5 | 50 | 25 | — |
| Battery A11 | 0.1 | 40 | 4 | — |
| Battery A12 | 0.2 | 40 | 8 | — |
| Battery A13 | 0.3 | 40 | 12 | — |
| Battery A14 | 0.4 | 40 | 16 | — |
| Battery A15 | 0.5 | 40 | 20 | — |
| Battery A16 | 0.1 | 25 | 3 | — |
| Battery A17 | 0.2 | 25 | 5 | — |
| Battery A18 | 0.3 | 25 | 8 | — |
| Battery A19 | 0.4 | 25 | 10 | — |
| Battery A20 | 0.5 | 25 | 13 | — |
| Battery B2 | 1.0 | 10 | 10 | LFP and LNCM mixed region in its entirety |
| Battery B3 | 1.0 | 20 | 20 | |
| Battery B4 | 0.1 | 100 | 10 | Both end portions being LFP alone region |

2. Fabrication of Negative Electrode

Referring to FIG. 7, negative electrode 20 formed as a sheet member in an elongated belt shape and having core material exposed portion EP in one end portion in direction of short side SD was fabricated. In the present experiment, negative electrode 20 in FIG. 7 had a length La of 6300 mm, negative electrode composite material layer 20b had a width Wa of 122 mm, and an electrode had a thickness of 130 μm.

A negative electrode composite material paste was obtained by mixing and kneading powders of a negative electrode active material (graphite), powders of a binder (SBR), and powders of a thickener (CMC) together with a solvent (water). Here, a compounding ratio (a mass ratio) of the negative electrode composite material was set to the negative electrode active material:the binder:the thickener=98:1:1.

Negative electrode composite material layer 20b was formed by coating one main surface of negative electrode collector core material 20a with the negative electrode composite material paste, followed by drying with hot air. In succession, negative electrode 20 was obtained by forming negative electrode composite material layer 20b similarly also on the opposite main surface of negative electrode collector core material 20a.

3. Preparation of Non-Aqueous Electrolyte

A non-aqueous electrolyte was prepared by dissolving $LiPF_6$ (1.0 mol/L) in a mixed solvent which was obtained by mixing EC, DMC, and EMC at a volume ratio of EC:DMC:EMC=3:3:4 and adding CHB (2 mass %) and BP (2 mass %) thereto.

4. Assembly

Separator 40 having a three-layered structure in which a PP layer, a PE layer, and a PP layer had been layered in this order and having a thickness of 24 μm was prepared. Referring to FIG. 3, an oval electrode group was obtained by winding positive electrode 10 and negative electrode 20 as being opposed to each other with separator 40 lying therebetween, and the electrode group was further pressed to a flat shape. Electrode group 80 of a wound type was thus obtained.

Referring to FIG. 2, case 52 and lid 54 provided in advance with positive electrode terminal 70 and positive electrode collector plate 74 as well as negative electrode terminal 72 and negative electrode collector plate 76 were prepared. Here, in the present experiment, since it is necessary to evaluate an amount of generation of a gas, CID 30 was not provided. After positive electrode collector plate 74 and negative electrode collector plate 76 were connected to electrode group 80, electrode group 80 was inserted in case 52, and case 52 and lid 54 were joined to each other by welding.

A prescribed amount of non-aqueous electrolyte was introduced through a liquid introduction hole (not shown) provided in lid 54, and a screw for sealing was fastened to the liquid introduction hole for hermetically sealing the inside. Thus, a non-aqueous secondary battery having a rated capacity (designed capacity) of 25 Ah was obtained.

<Batteries A2 to A20>

Adjustment was made by changing a width of first region R1 and second region R2 and a ratio of $LiFePO_4$ in the positive electrode active material in the first composite material and the second composite material such that "(W1+W2)/W0" and the "ratio of $LiFePO_4$ in the total mass of the positive electrode active material" were set to the values shown in Table 1. Here, a coating weight at the time of coating (a mass of coating of a positive electrode composite material per unit area) was adjusted each time such that a rated capacity was set to 25 Ah. Except for this point, batteries A2 to A20 were obtained similarly to battery A1.

<Battery B1>

The positive electrode composite material layer was obtained by coating the entire region of a portion on opposing main surfaces of the positive electrode collector core material where the positive electrode composite material layer was to be formed with the LNCM alone paste, followed by drying with hot air. The positive electrode was obtained by subsequent compression such that composite material density in the positive electrode composite material layer was 2.7 g/cm³. Here, a coating weight at the time of coating was adjusted such that a rated capacity was set to 25 Ah. Except for this point, battery B1 was obtained similarly to battery A1. Battery B1 corresponds to the comparative example in which the entire positive electrode composite material layer contains only LNCM as the positive electrode active material.

<Battery B2>

The positive electrode composite material layer was obtained by coating the entire region of a portion on opposing main surfaces of the positive electrode collector core material where the positive electrode composite material layer was to be formed with the mixture paste in which a breakdown (a mass ratio) of the positive electrode active material was set to $LiFePO_4$:$LiNi_{1/3}Co_{1/3}Mn_{1/3}O_2$=10:90, followed by drying with hot air. The positive electrode was obtained by subsequent compression such that composite material density in the positive electrode composite material layer was 3.0 g/cm³. Here, a coating weight at the time of coating was adjusted such that a rated capacity was set to 25 Ah. Except for this point, battery B2 was obtained similarly to battery A1. Battery B2 corresponds to the comparative example in which LFP is distributed over the entire region of the positive electrode composite material layer.

<Battery B3>

Battery B3 was obtained similarly to battery B2, except that a mixture paste in which a breakdown (a mass ratio) of the positive electrode active material was set to $LiFePO_4$:$LiNi_{1/3}Co_{1/3}Mn_{1/3}O_2$=20:80 was employed. Battery B3 corresponds to the comparative example in which LFP is distributed over the entire region of the positive electrode composite material layer.

<Battery B4>

An LFP alone paste was obtained by mixing and kneading powders of a positive electrode active material ($LiFePO_4$), powders of a conductive material (AB), and powders of a binder (PVdF) together with a solvent (NMP). In this paste, a compounding ratio (a mass ratio) of the positive electrode composite material was set to the positive electrode active material:the conductive material:the binder=86:10:4.

A portion to serve as third region R3 on one main surface of the positive electrode collector core material was coated with the LNCM alone paste and a portion to serve as first region R1 and second region R2 thereon was coated with the LFP alone paste, followed by drying with hot air. The positive electrode composite material layer was thus formed. In succession, after the positive electrode composite material layer was formed similarly also on the opposite main surface of the positive electrode collector core material, the positive electrode composite material layer was compressed such that the entire positive electrode composite material layer had an even thickness. The positive electrode was thus obtained. Here, composite material density in third region R3 was 2.7 g/cm³. In battery B4 as well, a coating weight at the time of coating was adjusted such that a rated capacity was set to 25 Ah.

Except for these points, battery B4 was obtained similarly to battery A1. Battery B4 corresponds to the comparative example in which first region R1 and second region R2 located in the respective end portions in the direction of width contain only LFP as the positive electrode active material.

<Evaluation>

Characteristics of each battery were evaluated as follows. In the description below, the unit "C" of a current value represents a current value with which a rated capacity of the battery is fully discharged in one hour. Since a battery having a rated capacity of 25 Ah is employed in the present experiment, 1 C corresponds to 25 A. "CC", "CV, and "CP" represent a constant current, a constant voltage, and constant power, respectively.

1. Evaluation of Output at Low SOC

Initially, in a constant temperature chamber set to 25° C., initial charging and discharging at a current value of 0.2 C and in a voltage range from 4.1 V to 3.0 V was carried out in each battery, so as to check an initial capacity of each battery. In succession, in that constant temperature bath, a quantity of electricity equivalent to 10% of SOC was provided to each battery based on the initial capacity.

Then, after each battery was left for 4 hours in the constant temperature chamber set to −6.7° C., CP discharging at three levels was carried out in that environment for 8 to 12 seconds, to thereby find a constant power output value for reaching 2.5 V in 10 seconds based on relation between a time period for discharging and electric power. Table 2 shows results.

2. Evaluation of Amount of Generation of Gas at the Time of Overcharge

An internal pressure sensor was attached to each battery. Then, through CC-CV charging (CC current value: 1 C, CV voltage: 4.1 V, cutoff current: 0.1 C), SOC of each battery was adjusted to 100% (full charge).

In an environment at 60° C., CC charging was continued at a current value of 1 C until SOC of each battery reached 140%, and an amount of increase in internal pressure in each battery was measured. An amount of generation of a gas was calculated based on the amount of increase in internal pressure thus obtained and a space volume (a design value) of the battery. Table 2 shows results. Here, in the present experiment, in order to eliminate influence due to difference in rated capacity, an amount of generation of a gas was evaluated by using a value [unit: $cm^3$/Ah] calculated by dividing the amount of generation of a gas [unit: $cm^3$] by a rated capacity [unit: Ah].

<Results and Discussion>

1. As to Battery B1

With battery B1 in which the entire region of the positive electrode composite material layer was composed of the positive electrode composite material containing only LNCM as the positive electrode active material, a capacity of the battery could be secured, however, output at low SOC was very low.

2. As to Batteries B2 and B3

With batteries B2 and B3 in which the entire region of the positive electrode composite material layer was composed of a composite material of LFP and LNCM as being mixed, output at low SOC improved, however, an amount of generation of the gas at the time of overcharge was smaller than with battery B 1.

3. As to Battery B4

With battery B4 in which both end portions in the direction of width of the positive electrode composite material layer were composed of the positive electrode composite material containing only LFP as the positive electrode active material, output at low SOC improved, however, an amount of generation of the gas at the time of overcharge significantly decreased. It is considered that, since LFP high in resistance was arranged in the both end portions of the positive electrode composite material layer in battery B4, a positive electrode potential at this portion must have been more likely to increase, however, reaction for generation of a gas was less likely to occur with increase in fill density of the positive electrode composite material layer and the generated gas was not efficiently emitted, which led to decrease in amount of generation of the gas.

4. As to Batteries A1 to A20

With batteries A1 to A20 in which the first region and the second region including the end portions in the direction of width of the positive electrode composite material layer were defined as a region of LFP and LNCM as being mixed and the central portion lying between the first region and the

TABLE 2

| | Both End Portions of Positive Electrode Composite Material Layer (First Region, Second Region) | | Entire Positive Electrode Composite Material Layer | Amount of Generation of Gas at the time of Overcharge [$cm^3$/Ah] | Output Value of Constant Power at Low SOC [W] |
|---|---|---|---|---|---|
| | (W1 + W2)/W0 [−] | LFP/(LFP + LNCM) [Mass %] | LFP/(LFP + LNCM) [Mass %] | | |
| Battery B1 | 0 | 0 | 0 | 15 | 120 |
| Battery A1 | 0.1 | 60 | 6 | 19 | 252 |
| Battery A2 | 0.2 | 60 | 12 | 21 | 270 |
| Battery A3 | 0.3 | 60 | 18 | 21 | 277 |
| Battery A4 | 0.4 | 60 | 24 | 18 | 288 |
| Battery A5 | 0.5 | 60 | 30 | 18 | 293 |
| Battery A6 | 0.1 | 50 | 5 | 18 | 251 |
| Battery A7 | 0.2 | 50 | 10 | 20 | 270 |
| Battery A8 | 0.3 | 50 | 15 | 20 | 273 |
| Battery A9 | 0.4 | 50 | 20 | 19 | 282 |
| Battery A10 | 0.5 | 50 | 25 | 17 | 290 |
| Battery A11 | 0.1 | 40 | 4 | 17 | 249 |
| Battery A12 | 0.2 | 40 | 8 | 19 | 257 |
| Battery A13 | 0.3 | 40 | 12 | 19 | 273 |
| Battery A14 | 0.4 | 40 | 16 | 19 | 285 |
| Battery A15 | 0.5 | 40 | 20 | 18 | 291 |
| Battery A16 | 0.1 | 25 | 3 | 16 | 247 |
| Battery A17 | 0.2 | 25 | 5 | 17 | 258 |
| Battery A18 | 0.3 | 25 | 8 | 18 | 265 |
| Battery A19 | 0.4 | 25 | 10 | 19 | 271 |
| Battery A20 | 0.5 | 25 | 13 | 17 | 284 |
| Battery B2 | 1.0 | 10 | 10 | 14 | 270 |
| Battery B3 | 1.0 | 20 | 20 | 12 | 280 |
| Battery B4 | 0.1 | 100 | 10 | 9 | 300 | second region was defined as a region composed of LNCM alone, in all of them, high output was obtained at low SOC and an amount of generation of the gas at the time of overcharge was large.

Based on comparison between battery A7 and battery B2 or between battery A9 and battery B2 which are the same in content of LFP in the positive electrode composite material, it can be seen that an amount of generation of a gas at the time of overcharge can be increased while output at low SOC is enhanced by distributing LFP locally in the both end portions of the positive electrode composite material layer rather than by distributing LFP over the entire region of the positive electrode composite material layer. This may be because, by arranging LFP in the both end portions of the positive electrode composite material layer which were portions where a positive electrode potential tends to locally increase, increase in potential in the both end portions was accelerated and generation of a gas was promoted, whereas in the central portion not containing LFP, composite material density remained low and an amount of generation of a gas did not decrease in the central portion, and hence an amount of generation of a gas increased in the positive electrode composite material layer as a whole.

Based on comparison between battery A7 and battery B4, it can be seen that, for increase in amount of generation of a gas, it is necessary to make both end portions not as a region composed only of LFP but as a region of LFP and LNCM as being mixed and to maintain composite material density in this portion to be low to some extent.

5. As to Ratio of LFP in Total Mass of Positive Electrode Active Material in Entire Positive Electrode Composite Material Layer The result in Table 2 is that, with batteries A1 to A20 in which a ratio of LFP in the total mass of the positive electrode active material in the entire positive electrode composite material layer was not lower than 3 mass % and not higher than 30 mass %, in all of them, high output was obtained at low SOC and an amount of generation of a gas at the time of overcharge was large. When the ratio was lower than 10 mass %, however, output at low SOC tended to slightly be low. Based on comparison among battery A15 in which the ratio was 20 mass %, battery A10 in which the ratio was 25 mass %, and battery A5 in which the ratio was 30 mass %, no great difference in characteristics was not found thereamong. Therefore, it is estimated that no more significant improvement in characteristics can be expected even when the ratio exceeds 30 mass %. Therefore, it can be concluded that the ratio of LFP in the total mass of the positive electrode active material in the entire positive electrode composite material layer is preferably not lower than 3 mass % and not higher than 30 mass %, more preferably not lower than 10 mass % and not higher than 30 mass %, further preferably not lower than 10 mass % and not higher than 25 mass %, and most preferably not lower than 10 mass % and not higher than 20 mass %.

6. As to Width of Both End Portions (First Region and Second Region)

Based on comparison in a set of batteries A1 to A5, a set of batteries A6 to A10, a set of batteries A11 to A15, and a set of batteries A16 to A20 in each set of which a ratio of LFP in the positive electrode active material in the first region and the second region was the same, it can be seen that an amount of generation of a gas attained to the relative maximum within a range (W1+W2)/W0 not smaller than 0.2 and not greater than 0.4. Therefore, it can be concluded that (W1+W2)/W0 is preferably not smaller than 0.2 and not greater than 0.4.

From the foregoing, it could be demonstrated that a non-aqueous secondary battery including positive electrode composite material layer 10b, in a cross-section in a direction of thickness of positive electrode composite material layer 10b, positive electrode composite material layer 10b including first region R1 including one end portion in a direction intersecting with direction of thickness TD, second region R2 including the other end portion, and third region R3 lying between first region R1 and second region R2, first region R1 being composed of the first composite material containing lithium iron phosphate 1 and lithium nickel cobalt manganese composite oxide 2, second region R2 being composed of the second composite material containing lithium iron phosphate 1 and lithium nickel cobalt manganese composite oxide 2, and third region R3 being composed of the third composite material containing lithium nickel cobalt manganese composite oxide 2, is a non-aqueous secondary battery high in output at low SOC and large in amount of generation of a gas at the time of overcharge.

Though one embodiment and examples of the present invention have been described above, the embodiment and the examples disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 lithium iron phosphate (LFP); 2 lithium nickel cobalt manganese composite oxide (LNCM); 10, 110 positive electrode; 10a, 110a positive electrode collector core material; 10b, 110b positive electrode composite material layer; 20, 120 negative electrode; 20a negative electrode collector core material; 20b negative electrode composite material layer; 32 deformable metal plate; 33 curved portion; 34 connection metal plate; 35 collector lead; 36 contact point; 38 insulating case; 40, 140 separator; 50 exterior body; 52 case; 54 lid; 55 safety valve; 70 positive electrode terminal; 72 negative electrode terminal; 74 positive electrode collector plate; 76 negative electrode collector plate; 80 electrode group; AW axis of winding; EP core material exposed portion; NF non-opposing portion; R1 first region; R2 second region; R3 third region; La, Lc length; W0, W1, W2, Wa width; LD longitudinal direction; SD direction of short side; and TD direction of thickness.

The invention claimed is:

1. A non-aqueous secondary battery, comprising a positive electrode having a positive electrode composite material layer disposed on a positive electrode current collector,
in a cross-section in a direction of thickness of said positive electrode composite material layer, said positive electrode composite material layer including a first region including one end portion in a direction intersecting with the direction of thickness, a second region including the other end portion, and a third region lying between said first region and said second region,
said first region being composed of a first composite material containing lithium iron phosphate and lithium nickel cobalt manganese composite oxide,
said second region being composed of a second composite material containing lithium iron phosphate and lithium nickel cobalt manganese composite oxide, and said third region being composed of a third composite material containing lithium nickel cobalt manganese composite oxide, said first region, said second region and said third region directly contact the positive electrode current collector;

a chemical composition of said first region is different from a chemical composition of said third region, and a chemical composition of said second region is different from the chemical composition of said third region; said positive electrode composite material layer is rectangular in a plan view;

said first region, said second region, and said third region extend along a longitudinal direction of said positive electrode composite material layer; and a relation of $0.2 \leq (W1+W2)/W0 \leq 0.4$ is satisfied, wherein, in said relation, $W0$ represents a width of said positive electrode composite material layer in a direction of a short side of said positive electrode composite material layer, $W1$ represents a width of said first region, and $W2$ represents a width of said second region, a ratio of lithium iron phosphate in a total mass of a positive electrode active material in said positive electrode composite material layer is from 10 mass % to 30 mass %;

a mass ratio of lithium iron phosphate to lithium nickel cobalt manganese composite oxide in a total mass of said first composite material is from 40:60 to 60:40; and a mass ratio of lithium iron phosphate to lithium nickel cobalt manganese composite oxide in a total mass of said second composite material is from 40:60 to 60:40, the non-aqueous secondary battery further comprising:

a negative electrode disposed on a negative electrode current collector; and a separator lying between the positive electrode and the negative electrode, wherein said first region, said second region, and said third region directly contact the separator.

2. The non-aqueous secondary battery according to claim 1, wherein the ratio of lithium iron phosphate in the total mass of the positive electrode active material in said positive electrode composite material layer is from 10 mass % to 20 mass %.

3. The non-aqueous secondary battery according to claim 1, wherein a density of said first region is higher than a density of said third region; and a density of said second region is higher than the density of said third region.

4. The non-aqueous secondary battery according to claim 1, wherein a first conductive material and a first binder are included in said first composite material;

a second conductive material and a second binder are included in said second composite material;

a third conductive material and a third binder are included in said third composite material; and a mass ratio of said first conductive material in the total mass of said first composite material is less than a mass ratio of said third conductive material in a total mass of said third composite material; and a mass ratio of said second conductive material in the total mass of said second composite material is less than the mass ratio of said third conductive material in the total mass of said third composite material.

5. The non-aqueous secondary battery according to claim 1, wherein a mass ratio of lithium iron phosphate in a total mass of lithium iron phosphate and lithium nickel cobalt manganese composite oxide in said first region and said second region in combination is larger than a mass ratio of lithium iron phosphate in a total mass of lithium iron phosphate and lithium nickel cobalt manganese composite oxide in an entire mass of said positive electrode composite material layer.

6. The non-aqueous secondary battery according to claim 1, wherein the non-aqueous secondary battery further comprises a negative electrode composite material layer, wherein an area of said negative electrode composite material layer in a plan view is larger than an area of said positive electrode composite material layer, said negative electrode composite material layer includes a non-opposing portion not opposed to said positive electrode composite material layer, and said non-opposing portion is in proximity to said first region and/or said second region.

7. The non-aqueous secondary battery according to claim 1, wherein the chemical composition of said first region is the same as the chemical composition of said second region.

8. The non-aqueous secondary battery according to claim 1, further comprising:

a non-aqueous electrolyte comprising a lithium salt, a solvent, and a gas generating agent.

9. The non-aqueous secondary battery according to claim 1, wherein the third composite material consists of 4 to 12 mass % of a conductive material, 1 to 7 mass % of a binder, and a remainder being the lithium nickel cobalt manganese composite oxide.

10. The non-aqueous secondary battery according to claim 1, wherein said third region contacts directly both of the separator and the positive electrode current collector, and the third region does not contain lithium iron phosphate.

11. The non-aqueous secondary battery according to claim 1, wherein the third region does not contain lithium iron phosphate.

* * * * *